United States Patent
Kudanowski et al.

(10) Patent No.: US 12,110,068 B2
(45) Date of Patent: Oct. 8, 2024

(54) CONTROL FOR ELECTRIC POWER STEERING

(71) Applicant: ZF AUTOMOTIVE UK LIMITED, Solihull (GB)

(72) Inventors: Maciej Kudanowski, Solihull (GB); Tamas Terdy, Birmingham (GB)

(73) Assignee: ZF AUTOMOTIVE UK LIMITED, Solihull (GB)

( * ) Notice: Subject to any disclaimer, the term of this patent is extended or adjusted under 35 U.S.C. 154(b) by 889 days.

(21) Appl. No.: 17/053,871

(22) PCT Filed: Apr. 18, 2019

(86) PCT No.: PCT/EP2019/060075
§ 371 (c)(1),
(2) Date: Nov. 9, 2020

(87) PCT Pub. No.: WO2019/219329
PCT Pub. Date: Nov. 21, 2019

(65) Prior Publication Data
US 2021/0221428 A1   Jul. 22, 2021

(30) Foreign Application Priority Data
May 18, 2018  (GB) ...................... 1808134

(51) Int. Cl.
*B62D 5/04*   (2006.01)

(52) U.S. Cl.
CPC ......... *B62D 5/0484* (2013.01); *B62D 5/0457* (2013.01); *B62D 5/0487* (2013.01)

(58) Field of Classification Search
CPC .... B62D 5/0496; B62D 5/046; B62D 5/0457; B62D 5/0484; B62D 5/0403; B62D 5/0487; H02P 29/028; H02P 29/032; H02P 27/06; H02P 29/68; H02P 25/22
See application file for complete search history.

(56) References Cited

U.S. PATENT DOCUMENTS

| | | | |
|---|---|---|---|
| 6,776,252 B1 * | 8/2004 | Andonian | B62D 5/003 180/402 |
| 2004/0007416 A1 * | 1/2004 | Furumi | B62D 5/046 180/443 |
| 2006/0183589 A1 * | 8/2006 | Naka | B62D 5/008 475/30 |
| 2007/0070667 A1 * | 3/2007 | Stancu | H02M 1/32 363/71 |

(Continued)

*Primary Examiner* — Stephen Holwerda
(74) *Attorney, Agent, or Firm* — Tarolli, Sundheim, Covell & Tummino LLP (57) ABSTRACT

A method of controlling an electric power assisted steering (EPS) system includes the steps: During a first mode of operation of the EPS system driving a motor using two inverter bridges simultaneously, the nominal current that is applied to the motor at any time by each bridge being limited to a first value, and during a fault mode of operation driving the motor using only one of the two inverter bridges. The nominal current that is applied to the motor at any time in the fault mode is limited to a second value. The method varying the second value as a function of one or more operating parameters of the EPS system. The second value is set higher than the first value when it is deemed safe to do so.

15 Claims, 4 Drawing Sheets

(56) References Cited

U.S. PATENT DOCUMENTS

| | | | | |
|---|---|---|---|---|
| 2012/0001572 A1* | 1/2012 | Millet | .................... | H02P 15/00 |
| | | | | 318/46 |
| 2013/0200827 A1* | 8/2013 | Kezobo | ................ | B62D 5/0487 |
| | | | | 318/400.21 |
| 2013/0299271 A1* | 11/2013 | Endo | .................... | B62D 5/0487 |
| | | | | 180/446 |
| 2014/0062348 A1* | 3/2014 | Isayeva | .................... | G05B 9/03 |
| | | | | 318/139 |
| 2016/0006387 A1* | 1/2016 | Nakamura | ........... | B62D 5/0463 |
| | | | | 701/43 |
| 2018/0346014 A1* | 12/2018 | Beyerlein | .............. | B62D 5/003 |

* cited by examiner (a)

CONTROL FOR ELECTRIC POWER STEERING

RELATED APPLICATION

This application corresponds to PCT/EP2019/060075, filed Apr. 18, 2019, which corresponds to British Application No. 1808134.9, filed May 18, 2018, the subject matter of which are incorporated herein by reference in their entirety.

TECHNICAL FIELD

The present invention relates to control of an electric power assisted steering (EPS) system. In particular, the invention relates to providing on-going steering assistance following a fault in one of the lanes of a multi lane redundant EPS system.

BACKGROUND TO THE INVENTION

Electric Power Assisted Steering (EPS) systems are well known in the prior art. The power generated by an electric motor is used to generate an assistance torque in the steering column in the same direction as a detected demand torque generated by a driver of the vehicle turning a steering wheel.

The applicant has previously proposed an EPS system that comprises two or more lanes, each including a plurality of semiconductor switching elements arranged as an inverter bridge which control the current delivered to the motor and thus the rotation of the motor. Each lane comprises one inverter bridge, the two bridges being substantially identical. A battery 110 powers the two inverter bridges although a separate battery may be used for each lane. A multi-phase motor is provided that acts on a steering rack. This motor has two independent sets of stator windings that share the same rotor. Each lane of the multi-phase motor comprises one of these sets of phase windings which are connected to the respective inverter bridge. As with the inverter bridge, the two sets of motor phases are substantially identical in size and construction so that for a given set of voltage waveforms applied to the phases by the inverter each lane will give substantially the same motor performance.

In use and in a normal mode of operation, the two inverter bridges are operated to cause current to flow in the respective lane in a manner which cause a torque to be applied to the rotor. The skilled person will be familiar with the operation of an inverter bridge to drive a motor, through the pulse width modulation of the switches of the invertor bridge. As such, in the normal mode each lane of the EPS system contributes approximately 50% of the torque needed to assist steering at any given time, the lanes working in parallel. This arrangement is considered beneficial in terms of allowing the use of inverter bridges and motor windings which are nominally smaller in rating that then they would need to be if they were to continuously apply the full 100 percent of the motor torque, reducing the costs of the EPS system.

In the case of a fault with one of the lanes, the EPS system remains operational since the other inverter bridge can still provide assistance. However, if the rating of the switches in not sufficient to deliver a continuous 100 percent of current required, the motor assistance will normally be at a reduced level equal to the 50 percent available from the one lane. This may be satisfactory in many applications.

Figure 3:
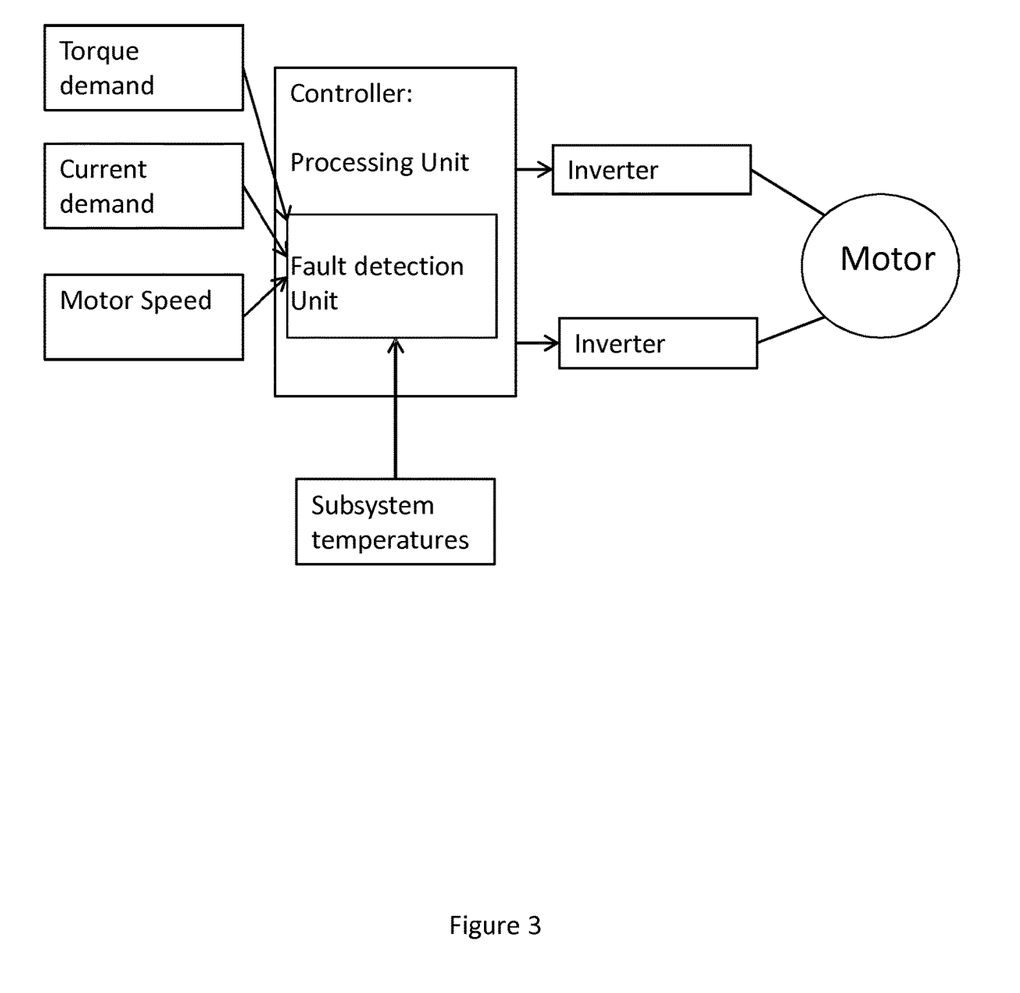
FIG. 3 shows schematically the two lanes and the controller which sets the maximum nominal current available to the motor from each lane.

Prior art U.S. Pat. No. 8,569,981 B2 proposes a method of maintaining the level of available steering assist after a failure in a dual lane EPS steering system for a predetermined time period after the first failure in one of the lanes. After the faulty lane has been disabled, the fully operational lane provides 100% higher motor current and thus assist torque for a predetermined time. An example of it is shown in FIG. 3 of the drawings, reproduced from the patent application, a fault occurring at time t0. As way of example, the X=5 seconds is being used to be the over-drive period between t0 and tX. After the preset time of X seconds, the overdrive of the lane stops to ensure that it is not at risk of overheating of the switches of the non-faulty lane.

An object of the present invention is to provide a method and apparatus for maintaining steering assistance after a fault in a lane which ameliorates some of the disadvantages foreseen in the prior art.

SUMMARY OF THE INVENTION

In accordance with a first aspect of the invention, there is provided a method of controlling an electric power assisted steering (EPS) system comprising at least two inverter bridges each connected to a multi-phase motor configured to provide power assist to steering of a vehicle, wherein each inverter bridge comprises a plurality of switching elements each associated with a phase of the motor, the method comprising; During a first mode of operation of the EPS system driving the motor using both inverter bridges simultaneously, the nominal current that is applied to the motor at any time by each bridge being limited to a first value, and During a fault mode of operation driving the motor using only one of the two inverter bridges whereby the nominal current that is applied to the motor at any time in the fault mode is limited to a second value, the method varying the second value as a function of one or more operating parameters of the EPS system whereby the second value is set higher than the first value when it is deemed safe to do so.

By nominal current in this application we mean the maximum current that is allowed to be output from the inverter, whose frequency will depend on the instantaneous motor speed. It is therefore the maximum output current that the inverter(s) of the EPS system is to deliver to the motor when the mode limits the current, so if the nominal current is limited to a value of X Amps, then the output current cannot exceed X Amps when so limited. The skilled person will understand that a given nominal current can be expressed in a number of ways, such as in terms of the peak of the typically sinusoidally varying output current or the root means square (RMS) value.

The method may in the normal mode drive the multi-phase motor using both of the lanes with the current limit for each lane set at the first value, and in the fault mode may disable a lane that is found to be faulty, a so called faulty lane, so that the drive of the motor is provided by the remaining non-faulty lane with a current limit uprated to the second value.

By varying the second value as a function of one or more operating parameters of the EPS system, the method may at any time select a second value which is higher than the first value provided it is considered to be safe to do so. This allows the impact of loosing one lane to be minimised, especially where the second value is uprated to provide a current equal to the combined current available from all lanes prior to a fault.

The method may comprise determining the operating parameters by monitoring one or more items of available information related to the operating conditions of the EPS system to determine the value that is to be set for the second limit value.

The second limit value maybe based on, amongst other items:
- the measured or calculated ambient temperature of the EPS system and in particular the non-faulty inverter bridge(s);
- the measured of calculated EPS subsystem temperature, in particular the invertor bridge(s) or parts thereof,
- the battery voltage(s) supplying the inverter bridges,
- the motor rotor speed,
- the instantaneous torque demand of the motor(s) of the EPS system,
- the instantaneous current demand of the motors(s) of the EPS system,
- an average torque demand over a predefined period of time prior to the instant of time; and
- an average torque demand over a predefined period of time prior to the instant of time.

In particular the parameter may comprise the temperature of one or more of the inverter switches. The temperature of each switch may be monitored constantly during the fault mode of operation, or the temperature calculated by monitoring the current flowing in each switching element or elsewhere in the EPS system.

Provided that the inverter bridge components were appropriately selected to withstand 200% of the instantaneous nominal current that they are expected to provide during normal operation when sharing the load with the other lane, then as long as all the components in the motor lane are within their safe operating limits, full motor current can be provided by a single lane of the dual lane redundant system. The safe operating limit will be absolute maximum temperature rating in most cases.

The method may comprise setting a first value that is equal to 50 percent of a nominal second value, and the method varies or de-rates the second value in use by reducing it towards or to equal the first value when the operating parameters indicate that one or more components of the EPS system are overheating and increases the second value back to the peak value when safe to do so at a later time.

By overheating we mean one or more parts of the EPS system lane reaching a temperature that exceeds a predefined safe operating temperature. This will vary from switching element to switching element in the design process of the EPS system and will therefore be a known constant value. The parts may comprise the switches and the motor phase windings.

The method of the invention may be applied to dual redundant systems but any architecture having N motor lanes, where $N \geq 2$. The maximum nominal level of provided motor current (steering assist) of each lane in case of losing drive capability of a single lane will be equal to the first value $*N/(N-1)$, where N is the number of motor lanes and the first value is the 100% nominal current capability of a single lane.

Additionally, this varying of the second limit value can be adjusted to maximize the available assist even after the de-rating of the second value has started. In other words, the method of the invention allows for having available steering assist of each motor lane between 100% and $100\%*N/(N-1)$ depending on the boundary conditions.

As an example, if the lane had already reached the thermal limits and the method had started to de-rate the available nominal motor current for the lane, that does not necessarily mean that the second value will go back to the full 100% as long as the temperatures (and other parameters of the system) allow for an intermediate value which is still higher than 100% but not quite the ideally needed $100\%*N/(N-1)$.

The method may therefore set a second value that has a value in a range from 0 to 100 percent full rated current depending on the operational parameters of the EPS system. Preferably the method may set the value in a range from 50 percent to 100 percent, as it is known that 50 percent is always safe in a two lane system. For systems with more than 2 lanes, generalised as N lanes, the lower limit may be set accordingly.

In the event that the method reduces the second value because an operational parameter indicates that a part of the lane is overheating or may be at risk of overheating, the second value may be subsequently increased when the part stops to be at risk of overheating or is no longer overheating.

The method may therefore continually set a maximum safe value for the second limit value for the duration of the operation of the EPS system in the fault mode. This minimises the time at which the EPS system cannot deliver the full nominal 100 percent of current.

The method may operate the EPS system in the normal mode when all lanes are deemed to be operational. The method may operate the EPS system in the fault mode when one lane is deemed to be faulty. Provided there is at least one non-faulty lane the method may continue to operate the EPS system in the fault mode.

The method may therefore comprise monitoring the condition of the two lanes to determine if the lane is operational or faulty. If there are more than two lanes, each lane may be monitored.

In accordance with second aspect of the invention, there is a system for an electric power assisted steering (EPS) apparatus comprising at least two inverter bridges each connected to a multi-phase motor configured to provide power assist to steering of a vehicle, wherein each inverter bridge comprises a plurality of switching elements each associated with a phase of the motor, the system further comprising a controller which is arranged such that:
- during a first mode of operation of the EPS system the controller drives the motor using both inverter bridges simultaneously, the nominal current that is applied to the motor at any time by each bridge being limited to a first value, and
- during a fault mode of operation the controller drives the motor using only one of the two inverter bridges whereby the nominal current that is applied to the motor at any time in the fault mode is limited to a second value,
- the controller varying the second value throughout the duration of the fault mode of operation as a function of one or more operating parameters of the EPS system.

The system may continue to operate in the fault mode until such time as the fault in the faulty lane has been cleared, for instance during a reset of the vehicle or a service.

The system may include a processing unit which determines the value of the second value at least when the EPS system is operating in the fault mode.

The processing unit may receive signals representative of the one or more operating parameters of the EPS system. These may be digital or analogue signals.

The processing unit may determine the second value periodically when in the fault mode, perhaps every second, or every T seconds where T is any numerical value. The rate of determining the second value may depend on the rate at which the operating parameters are measured or calculated.

The processing unit and the controller may be combined into a single signal processing unit.

The controller may determine the current to be applied to the lane in the fault mode according to the demanded torque, and from this may determine voltages to be applied to each phase of the lane. The controller may limit the current and the voltages according to the value of the second nominal current value, thereby ensuring the lane does not overheat.

The system may further comprise a failure event detection means. The failure detection means may comprise monitoring means configured to monitor the two lanes to determine if a lane if operational or faulty. The system may switch between the normal mode and the fault mode under the control f the failure event detection means.

The switching elements of each inverter bridge may be rated to handle a current at the first nominal value indefinitely but not to be able to safely conduct the current at the peak value for the second limit (i.e. before de-rating) indefinitely but able to handle that current for a short period of time depending on the operating conditions of the EPS system. Monitoring and constantly varying the second current limit value as required allows these switches to be safely uprated where conditions allows.

Features which are described in the context of separate aspects and embodiments of the invention may be used together and/or be interchangeable. Similarly, where features are, for brevity, described in the context of a single embodiment, these may also be provided separately or in any suitable sub-combination. Features described in connection with the device may have corresponding features definable with respect to the method(s) and the computer program and these embodiments are specifically envisaged.

Where reference is made to an "event" or "fault condition" or the like, this is to be construed broadly. It should be understood that this covers "internal" failures/faults e.g. a short circuit. It also covers "external" events that may cause a FET to be subjected to a high back-EMF e.g. the EPS motor being externally rotated (by a service engineer) at high speed during garage servicing of a vehicle and thus acting as a generator.

BRIEF DESCRIPTION OF DRAWINGS

Embodiments of the invention will now be described with reference to the Figures of the accompanying drawings in which.

DETAILED DESCRIPTION OF EMBODIMENTS OF THE INVENTION

Figure 1:
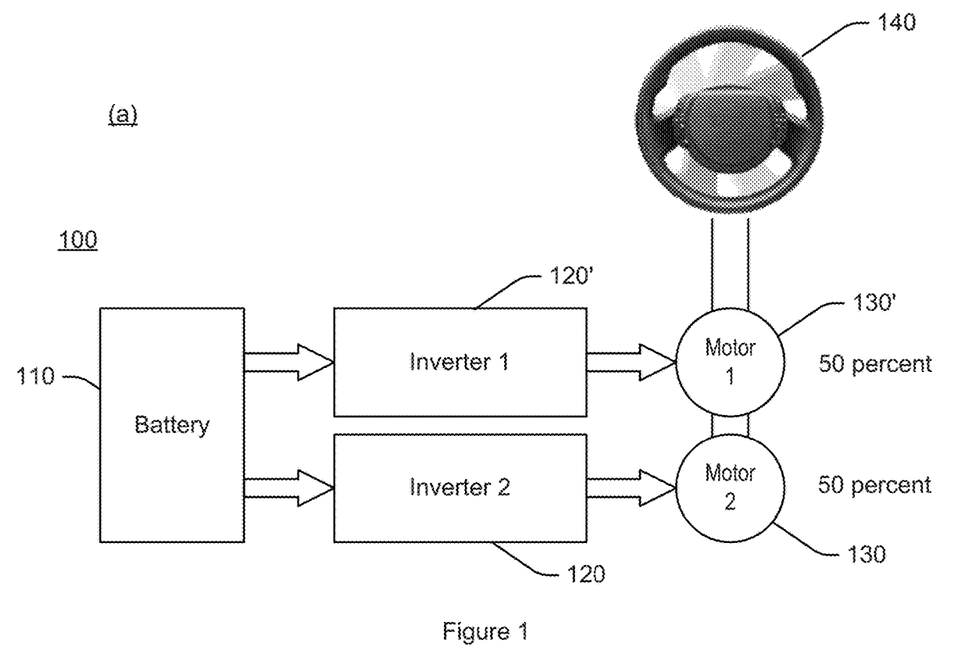
FIG. 1 shows an embodiment of a dual-bridge EPS control system in accordance with the invention during a normal mode of operation.
Figure 2:
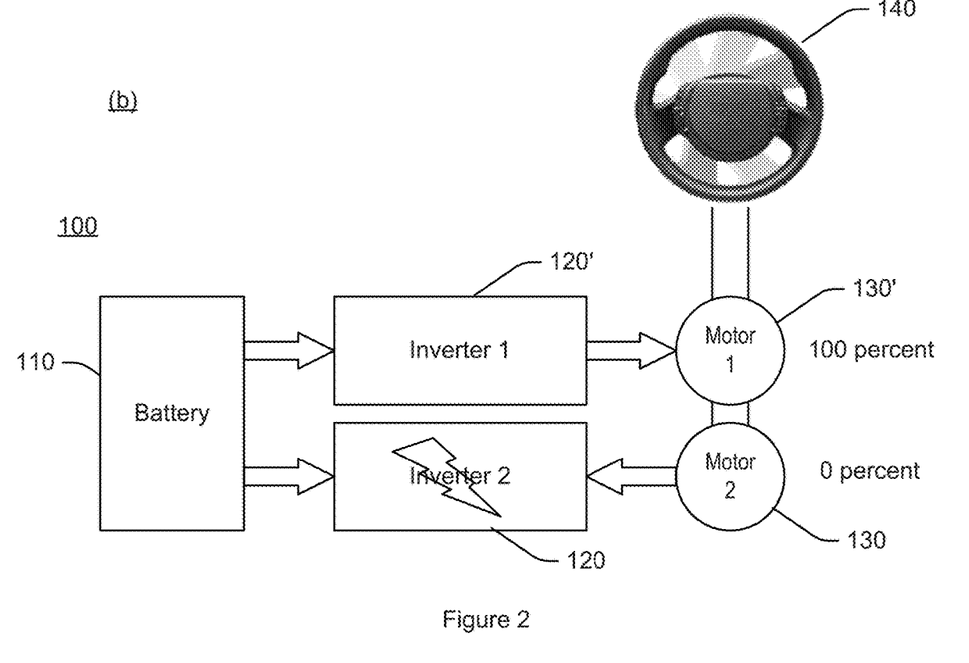
FIG. 2 corresponds to FIG. 1 showing the EPS control system in a fault mode of operation.

FIGS. 1 and 2 represent a first embodiment of a dual-bridge EPS control system 100 in accordance with the present invention. Although a two lane system is shown, this is exemplary only and the invention may be applied to EPS systems have three or more lanes.

The EPS system comprises first 120 and second 120' inverter bridges connected to and configured to drive first 130 and second 130' motors, respectively. Each motor comprises a set of phase windings, in this example forming three phases connected in a star topology. The first bridge and motor form one lane, and the second bridge and motor form a second lane. The two lanes are identical in this example, of the construction of only a first lane will now be described.

A DC voltage is applied by a battery 110 between a supply rail and a ground rail and is connected to the 3-phase motor 130 via an inverter 120. The inverter 120 comprises three parallel arms (A, B, C), each of which has a pair of Silicon (Si) MOSFETs 122a, 122b, 124a, 124b, 126a, 126b connected in series between a supply rail and a ground rail. The motor phases A, B, C are connected to each other in a star configuration and branch off from between a respective pair of MOSFETs. As such, MOSFETs 122a, 122b are connected to a first phase A of the motor 130, MOSFETs 124a, 124b are connected to a second phase B of the motor 130, and MOSFETs 126a, 126b are connected to a third phase C of the motor 130. The pairs of MOSFETs associated with each phase (arms A, B, C) are connected in parallel to each other and to the battery 110. A power filter (not shown) may be provided between the battery 110 and the MOSFETs 122a, 122b, 124a, 124b, 126a, 126b.

The MOSFETS are also arranged in two groups with MOSFETS 122a, 124a, 126a on the "high" side of the inverter 120 and MOSFETS 122b, 124b, 126b on the "low" side of the inverter 120. The terms "high" and "low" are labels for ease of reference only. Each MOSFET 122a, 122b, 124a, 124b, 126a, 126b comprises a transistor channel and an intrinsic body diode connected in parallel with the transistor channel. The gate of each MOSFET 122a, 122b, 124a, 124b, 126a, 126b is connected to a gate driver to switch each MOSFET ON or OFF. Each gate driver received control signals from a control block (not shown).

In use, the controller applies voltage signals to the gate of each MOSFET to switch them ON and OFF rapidly in a predefined sequence, thus controlling the voltage applied to each phase of the motor and current flowing through the windings. This in turn controls the strength and orientation of the magnetic field produced by the windings, and hence the torque and speed of the motor. By using a sufficiently rapid pulse width modulation (PWM) switching pattern, a phase drive waveform can be applied that approximates the ideal sinusoidal waveform required to rotate the motor smoothly. This applies for both bridges 120, 120' in normal operation, i.e. all MOSFETs of both bridges 120, 120' are turned ON and OFF in a controlled manner during normal operation.

When the steering wheel 140 of a vehicle (not shown) is operated by a driver, a demand torque is detected by the system. The controller determines from this torque demand a current demand for each of the two motors 130, 130', and appropriate PWM gate signals are applied to the switches to cause the motor to generate an assistance torque, dependent on the demand torque and vehicle speed, which acts on the steering rack to assist steering the vehicle.

The two motors 130, 130' may be physically located in one housing or separately but, in either case, they act on the same steering rack and, in normal operation, each contribute approximately 50% of the steering power. This is easily achieved if the two lanes are substantially identical by providing the same PWM drive signals to the two inverter bridges from the controller. The motors 130, 130' may conveniently be brushless 3-phase AC permanent magnet synchronous (PMSM) motors.

In normal operation, each motor applies the same torque. This means each inverter bridge applies the same current to the respective phase windings of the lane. Because only 50 percent nominal peak current is needed from each lane, the switches can be chosen to be of a relatively low rating where they can safely supply the 50 percent nominal peak current continuously if required, but not rated high enough to apply 100 percent of the nominal peak current from one lane continuously. If this was provided the switches would be expected to overheat leading to a failure. For ease of explanation this 50 percent limit will be considered hereinafter to be a first current limit value.

A fault can develop in either lane, often in the inverter bridge, that may render it unable to drive the motor. The most likely fault lies with the switching elements of the inverter bridges 120,120'. Other faults that can occur include a loss of connection between the bridge and the motor windings, or a short circuit or open circuit across one or more of the windings.

The system includes a fault detection unit which monitors the operation of each lane. When a fault is detected the fault detection unit instructs the controller to operate the EPS system in a fault mode of operation as follows.

In the fault mode, the faulty lane is switched off so that it does not provide any current that drives the motor. Instead of sharing the motor torque across the two lanes, all torque is provided by a single non-faulty lane. Where there are more than two lanes, the fault mode will share the torque across each of the remaining non-faulty lanes.

To ensure that the amount of steering assistance is not reduced, the nominal current limit is increased from the first current limit value to a second higher current limit value. The amount by which it is increased is set according to one or more operating parameters of the EPS system.

In the fault mode, the second current limit value is set at the 100 percent value for as long as possible, being reduced if the operating conditions indicate that it is not safe to do so due to overheating or a risk of overheating. In that case, the second value is de-rated to a reduced level. Notably, by monitoring the operational parameter continuously when in the fault mode the de-rated second value may be increased as soon as it is possible to do so without risk of overheating. It will be continuously varied to give the most assistance possible from the non-faulty lane so that the impact of loosing one lane is minimised.

Figure 4:
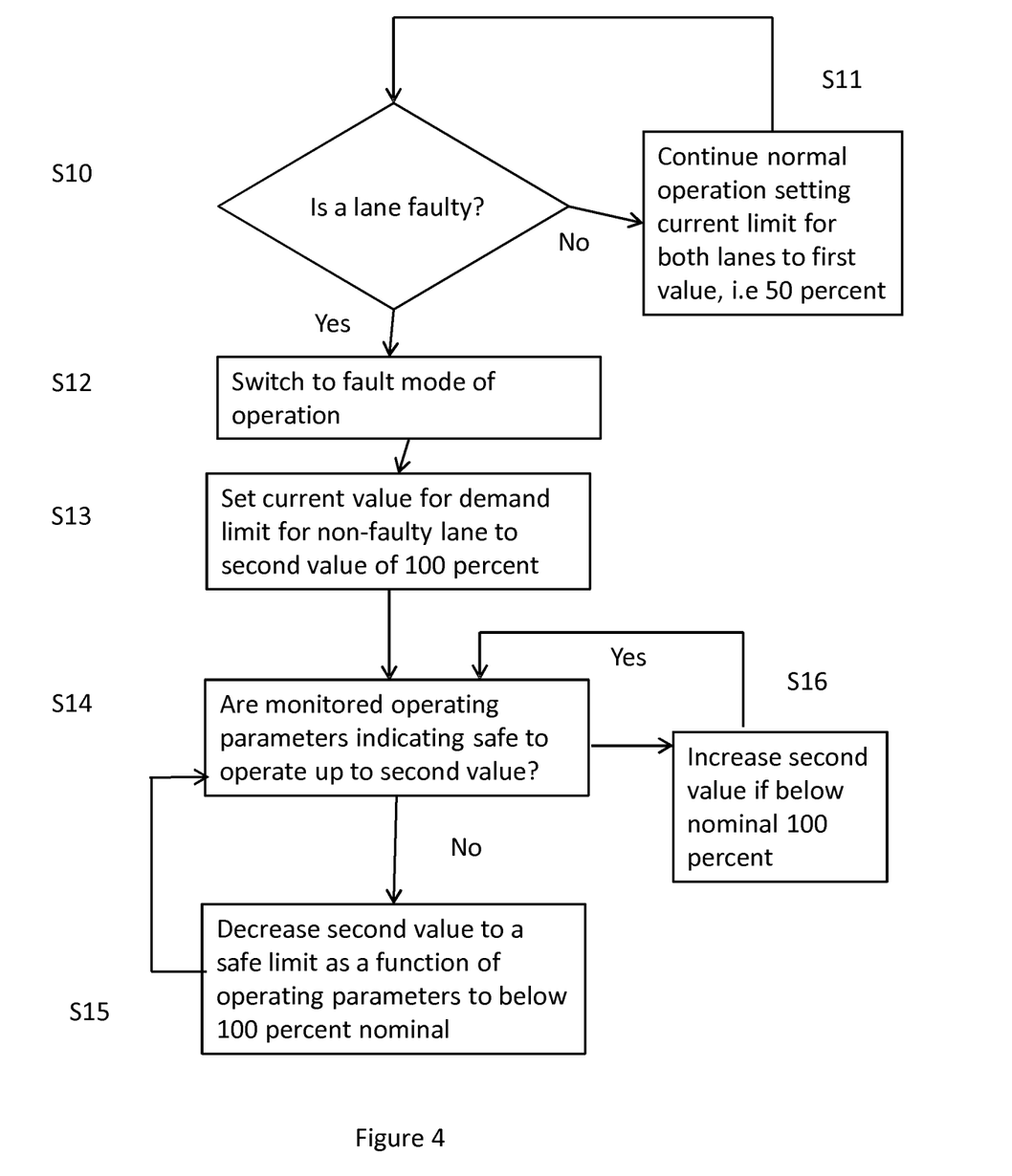
FIG. 4 is a flowchart of a control method in accordance with an embodiment of the invention.
Figure 5:
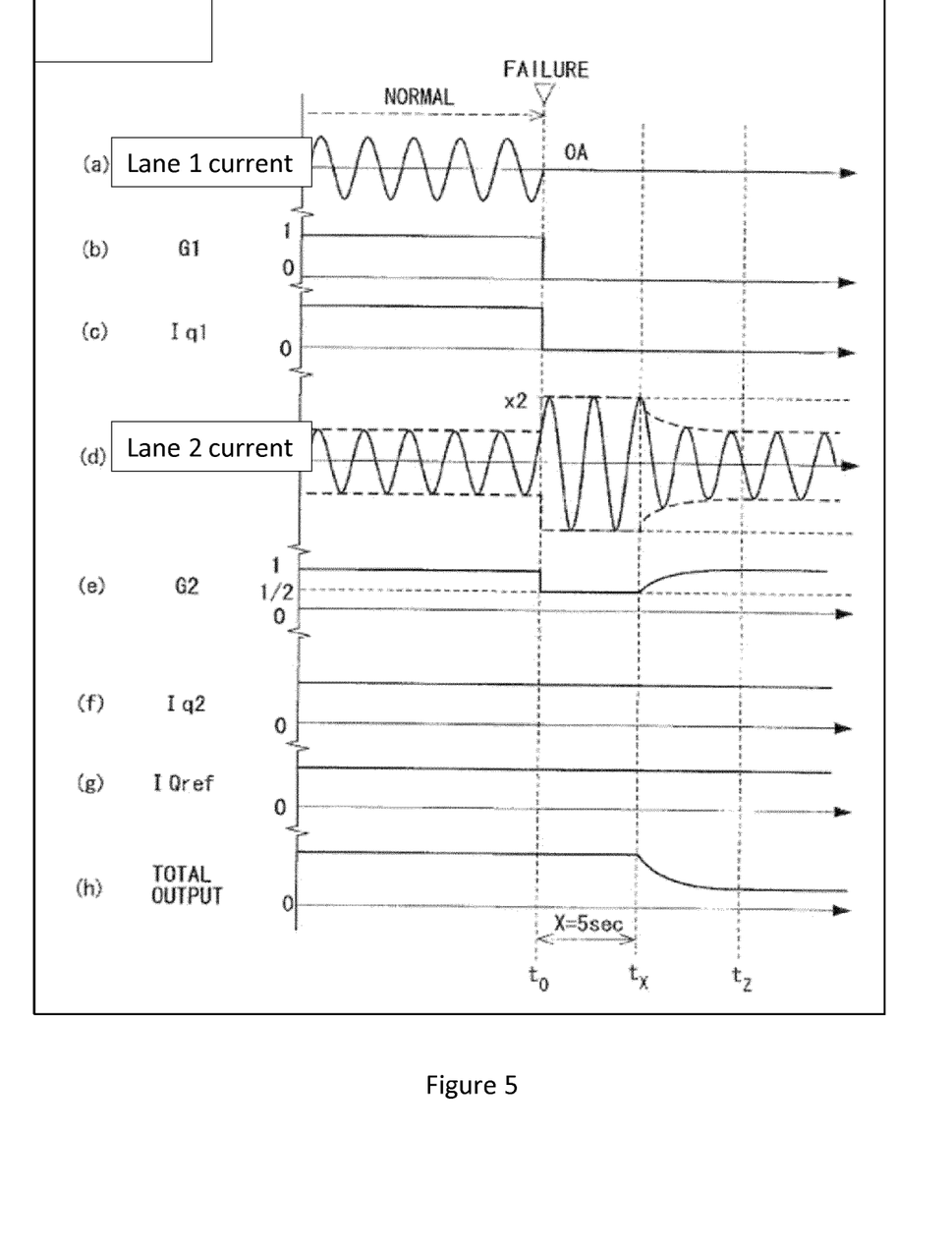
FIG. 5 shows a prior art method of operating a dual bridge EPS system where a single lane is used to provide an overrated current limit for a fixed period of time after a fault has occurred.

A method of carrying out an embodiment of the invention is summarised in FIG. 4. In a first step S10, it is assumed that all lanes are correctly functioning. The nominal maximum current that can be supplied from each lane is set to 50 percent of the maximum current demand, with both lanes sharing the duties of providing torque to the EPS system.

The operational parameters of the motor are continuously monitored and if all is well the EPS system in step 11 continues to run in the normal mode of operation. If a fault in one lane is detected, that lane is turned off an the operation is switched to a fault mode in step 12. Initially in step 13 a value of the current limit is uprated to 100 percent for the remaining non-faulty lane so that the motor can apply the same level of assistance that it could in the normal mode. The operational parameters of the EPS system are monitored in step 14 and if it is deemed unsafe to run at the 100 percent uprating then in step 15 the second value is de-rated to a safe value less than 100 percent. It is known that 50 percent is safe so in a simple system it could jump down to 50 percent. However, it is preferable to de-rate as little as possible to give the maximum torque assistance to the driver. On the other hand, if the second value is below 100 percent and it is deemed safe to increase the second value, then in step 16 the second value can be increased up to 100 percent or as high as deemed safe at that instant.

The proposed method of the present invention has the inherent benefit of having the capability to reverse the de-rating. This means that if the boundary conditions change in a favourable way (e.g. the load conditions allow the temperature of power stage components to decrease), the available level of motor current can be increased back up again to 100 percent, and the later increased/decreased over time to give optimum steering assistance levels within the safe operating limits of the EPS system.

The method of the present invention may provide the following key benefits:
No detailed characterization is needed to determine the allowable time for the overrating of the non-faulty lane(s)
Derating to below 100 percent adapts to operating conditions
Applicable to N lanes where N is any integer of 2 or higher From reading the present disclosure, other variations and modifications will be apparent to the skilled person. Such variations and modifications may involve equivalent and other features which are already known in the art, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and any reference signs in the claims shall not be construed as limiting the scope of the claims.

The invention claimed is:

1. A method of controlling an electric power assisted steering (EPS) system comprising at least two inverter bridges each connected to a multi-phase motor configured to provide power assist to steering of a vehicle, wherein each inverter bridge comprises a plurality of switching elements each associated with a phase of the motor, the method comprising:
during a first mode of operation of the EPS system driving the motor using both inverter bridges simultaneously, limiting the nominal current that is applied to the motor at any time by each bridge to a first value; and during a fault mode of operation driving the motor using only one of the two inverter bridges, initially setting a second value of the non-faulty lane at 100 percent value of the applied nominal current of the EPS system, and limiting the nominal current that is applied to the motor at any time in the fault mode to the second value, dynamically varying the second value higher than the first value as a function of one or more operating parameters of the EPS system by decreasing the second value in response to the one or more operating parameters indicating potential overheating of the EPS system and by increasing the second value in response to the one or more operating parameters of the EPS system indicating a decrease in temperature of the EPS system;

while controlling the EPS system in the first mode, driving the multi-phase motor using both of the lanes with the current limit for each lane set at the first value, upon the fault mode occurring, the EPS system disabling a lane that is found to be faulty, so that the drive of the motor is provided by the remaining non-faulty lane with a current limit uprated to the second value.

2. The method according to claim 1 further comprising: determining the operating parameters by monitoring one or more items of available information related to the operating conditions of the EPS system to determine the value that is to be set for the second limit value.

3. The method according to claim 1 in which the second limit value is based on at least one of:
the measured or calculated ambient temperature of the non-faulty inverter bridge(s) of the EPS system;
the measured or calculated EPS subsystem temperature, the inverter bridge(s) or parts thereof,
the battery voltage(s) supplying the inverter bridges,
the motor rotor speed,
the instantaneous torque demand of the motor(s) of the EPS system,
the instantaneous current demand of the motors(s) of the EPS system,
an average torque demand over a predefined period of time prior to the instant of time; and
an average torque demand over a predefined period of time prior to the instant of time.

4. The method according to claim 1 further comprising:
setting a first value that is equal to 50 percent of a nominal second value, and the controlling the EPS system varies or de-rates the second value in use by reducing it towards or to equal the first value when the operating parameters indicate that one or more components of the EPS system are overheating and increases the second value back to the peak value when safe to do so at a later time.

5. The method according to claim 1 further comprising:
setting a second value that has a value in a range from 0 to 100 percent full rated current depending on the operating parameters of the EPS system.

6. A method according to claim 1, wherein in the event that the controlling the EPS system reduces the second value because an operating parameter indicates that a part of the lane is overheating or may be at risk of overheating, the second value is subsequently increased when the part stops to be at risk of overheating or is no longer overheating.

7. The method according to claim 1, wherein each of the at least two inverter bridges is connected to one of a respective at least two multi-phase motors.

8. The method according to claim 1, wherein the one or more operating parameters of the EPS system comprises a temperature of the EPS system.

9. A system for an electric power assisted steering (EPS) apparatus comprising at least two inverter bridges each connected to a multi-phase motor configured to provide power assist to steering of a vehicle, wherein each inverter bridge comprises a plurality of switching elements each associated with a phase of the motor, the system further comprising a controller which is arranged such that:
during a first mode of operation of the EPS system the controller drives the motor using both inverter bridges simultaneously, the nominal current that is applied to the motor at any time by each bridge being limited to a first value, and during a fault mode of operation the controller drives the motor using only one of the two inverter bridges whereby the nominal current that is applied to the motor at any time in the fault mode is limited to a second value, the second value of a non-faulty bridge of the inverter bridges initially being set at a 100 percent value of the applied nominal current of the EPS system, the controller dynamically varying the second value throughout the duration of the fault mode of operation as a function of one or more operating parameters of the EPS system by decreasing the second value in response to the one or more operating parameters indicating potential overheating of the EPS system and by increasing the second value in response to the one or more operating parameters of the EPS system indicating a decrease in temperature of the EPS system.

10. The system according to claim 9, wherein each of the at least two inverter bridges is connected to one of a respective at least two multi-phase motors.

11. The system according to claim 9, wherein the one or more operating parameters of the EPS system comprises a temperature of the EPS system.

12. A method of controlling an electric power assisted steering (EPS) system comprising a first lane and a second lane, each of the first and second lanes comprising an inverter bridge that is electrically coupled to at least one motor, the method comprising:
generating a driving current having a nominal amplitude;
providing a first portion of the driving current through the first lane at a first amplitude and a second portion of the driving current through the second lane at the first amplitude to drive the at least one motor in a normal mode of operation of the EPS system;
in response to a fault of the first lane, disabling the first lane and providing the second portion of the driving current through the second lane to drive the at least one motor in a fault mode of operation;
initially setting a current limit of the second portion of the driving current to the nominal amplitude in the fault mode of operation;
monitoring operating parameters of the EPS system in the fault mode of operation; and
dynamically varying the current limit by decreasing the current limit to a second amplitude that is greater than the first amplitude in response to the operating parameters indicating potential overheating of the EPS system, and by increasing the current limit from the second amplitude in response to the operating parameters indicating a decrease in temperature of the EPS system in the fault mode of operation.

13. The method of claim 12, wherein monitoring the operating parameters of the EPS system comprises monitoring at least one of:
   an ambient temperature of the second lane;
   a temperature of the inverter bridge of the second lane;
   a battery voltage;
   a rotation speed of the at least one motor;
   an instantaneous torque demand of the at least one motor;
   an instantaneous current demand of the at least one motors; and
   an average torque demand over a predefined period of time.

14. The method of claim 12, wherein dynamically varying the current limit comprises increasing the current limit from the second amplitude to the nominal amplitude in response to the temperature of the EPS system remaining less than an unsafe threshold for the EPS system.

15. The method of claim 12, wherein the at least one motor comprises:
   a first motor electrically coupled to the first lane; and
   a second motor electrically coupled to the second lane.

* * * * *